(12) United States Patent
Oyama

(10) Patent No.: US 12,556,788 B2
(45) Date of Patent: Feb. 17, 2026

(54) ELECTRONIC MODULE AND IMAGING APPARATUS

(71) Applicant: CANON KABUSHIKI KAISHA, Tokyo (JP)

(72) Inventor: Ryuji Oyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 18/624,705

(22) Filed: Apr. 2, 2024

(65) Prior Publication Data
US 2024/0340510 A1    Oct. 10, 2024

(30) Foreign Application Priority Data
Apr. 5, 2023   (JP) .................................. 2023-061308

(51) Int. Cl.
| | | |
|---|---|---|
| *H04N 23/53* | (2023.01) | |
| *G02B 6/00* | (2006.01) | |
| *G02F 1/1333* | (2006.01) | |
| *H04N 23/54* | (2023.01) | |
| *H04N 23/55* | (2023.01) | |

(52) U.S. Cl.
CPC .......... *H04N 23/53* (2023.01); *G02F 1/1333* (2013.01); *H04N 23/54* (2023.01); *G02B 6/00* (2013.01); *H04N 23/55* (2023.01)

(58) Field of Classification Search
CPC ........ G03B 17/12; H04N 23/54; H04N 23/57; H04N 23/55; H04N 23/51; H04N 23/53; G02F 1/1333; G02B 6/00
See application file for complete search history.

(56) References Cited

U.S. PATENT DOCUMENTS

| | | | | |
|---|---|---|---|---|
| 11,194,135 | B2 * | 12/2021 | Moriya ................ | G02B 3/0056 |
| 11,864,436 | B2 * | 1/2024 | Ochi .................... | H10K 59/131 |
| 12,220,891 | B2 * | 2/2025 | Yu ........................ | B30B 15/061 |
| 2010/0073594 | A1 * | 3/2010 | Miyazaki .......... | G02F 1/133308 |
| | | | | 349/58 |
| 2010/0309354 | A1 * | 12/2010 | Tsuduki ................ | H04N 23/54 |
| | | | | 348/294 |

(Continued)

FOREIGN PATENT DOCUMENTS

| | | |
|---|---|---|
| JP | 2004312666 A | 11/2004 |
| JP | 2010041218 A | 2/2010 |

(Continued)

*Primary Examiner* — Chiawei Chen
(74) *Attorney, Agent, or Firm* — Canon U.S.A., Inc., IP Division

(57) ABSTRACT

An electronic module includes a first substrate and a frame member. The frame member includes a first surface and a second surface, and an inner wall side surface in contact with the first and second surfaces. The inner wall side surface includes at least a first end face and a second end face. A normal line to the second surface is a first line, and a line parallel to the second surface, passing through a point where the first end face contacts the second end face, is a second line. An angle formed by the first line and the first end face is different from an angle formed by the first line and the second end face. A distance between the second surface and the second line with respect to the second surface is larger than or equal to 10% of a distance between the first and second surfaces.

12 Claims, 16 Drawing Sheets

(56) References Cited

U.S. PATENT DOCUMENTS

| | | | |
|---|---|---|---|
| 2012/0050634 A1* | 3/2012 | Kim | G02F 1/1333 349/58 |
| 2012/0050635 A1* | 3/2012 | Yoo | G02F 1/133308 349/58 |
| 2012/0248294 A1* | 10/2012 | Kohama | H04N 23/55 250/214 P |
| 2015/0264290 A1* | 9/2015 | Happoya | H04N 23/54 29/832 |
| 2015/0305160 A1* | 10/2015 | Funahashi | H01L 21/4857 174/251 |
| 2016/0028928 A1* | 1/2016 | Dobashi | H04N 23/54 348/373 |
| 2016/0190411 A1* | 6/2016 | Oh | H10H 29/142 438/28 |
| 2017/0005125 A1* | 1/2017 | Itonaga | G02B 7/14 |
| 2017/0134630 A1* | 5/2017 | Park | H04N 23/54 |
| 2019/0049793 A1* | 2/2019 | Teragawa | G02F 1/133605 |
| 2020/0084349 A1* | 3/2020 | Huang | H04N 23/57 |
| 2021/0141263 A1* | 5/2021 | Sun | G02F 1/133308 |
| 2021/0313366 A1* | 10/2021 | Yajima | H04N 23/54 |
| 2022/0021793 A1* | 1/2022 | Park | H04N 23/54 |
| 2022/0130880 A1* | 4/2022 | Matsugai | B29C 33/42 |
| 2022/0360694 A1* | 11/2022 | Huang | H04N 23/54 |
| 2022/0417455 A1* | 12/2022 | Kawahito | H10F 39/803 |
| 2024/0094597 A1* | 3/2024 | Song | G03B 3/10 |
| 2024/0422415 A1* | 12/2024 | Hwang | G03B 17/12 |

FOREIGN PATENT DOCUMENTS

| | | |
|---|---|---|
| JP | 2021087032 A | 6/2021 |
| WO | 2015060345 A1 | 3/2017 |

* cited by examiner

ELECTRONIC MODULE AND IMAGING APPARATUS

BACKGROUND

Field

The present disclosure relates to an electronic module and an imaging apparatus.

Description of the Related Art

An element substrate having optical elements, semiconductor elements, and other circuit elements forms a conventional electronic module in combination with a frame member for fixing the element substrate. A region partitioned by the frame member of the element substrate is called a display region having a role of displaying still images and moving images.

Japanese Patent Application Laid-Open No. 2021-87032 discusses an electronic module including an element substrate and a frame member having inner walls, disposed to surround the element substrate.

However, in the electronic module discussed in Japanese Patent Application Laid-Open No. 2021-87032, projections may be formed on side surfaces of inner walls of the frame member of the conventional electronic module in the manufacturing process. Since some projections reach the display region, failure to remove the projections may degrade the display image quality. The projections need to be removed to prevent the projections from affecting the display region.

SUMMARY

The present disclosure is directed to providing an electronic module that prevents projections on side surfaces of a frame member.

According to an aspect of the present disclosure, an electronic module includes a first substrate, and a frame member disposed on the first substrate and including a first surface facing the first substrate, a second surface disposed on a side opposite to the first surface, and an inner wall side surface in contact with the first surface and the second surface, wherein the inner wall side surface includes at least a first end face in contact with the first surface, and a second end face in contact with the second surface, wherein a normal line to the second surface is a first line, and a line parallel to the second surface, passing through a point where the first end face contacts the second end face, is a second line, wherein an angle formed by the first line and the first end face is different from an angle formed by the first line and the second end face, and the second end face is not parallel to the first line, and wherein a distance between the second surface and the second line in a vertical direction with respect to the second surface is larger than or equal to 10% of a distance between the first surface and the second surface.

Further features of the present disclosure will become apparent from the following description of exemplary embodiments with reference to the attached drawings.

DESCRIPTION OF THE EMBODIMENTS

Figure 1A:
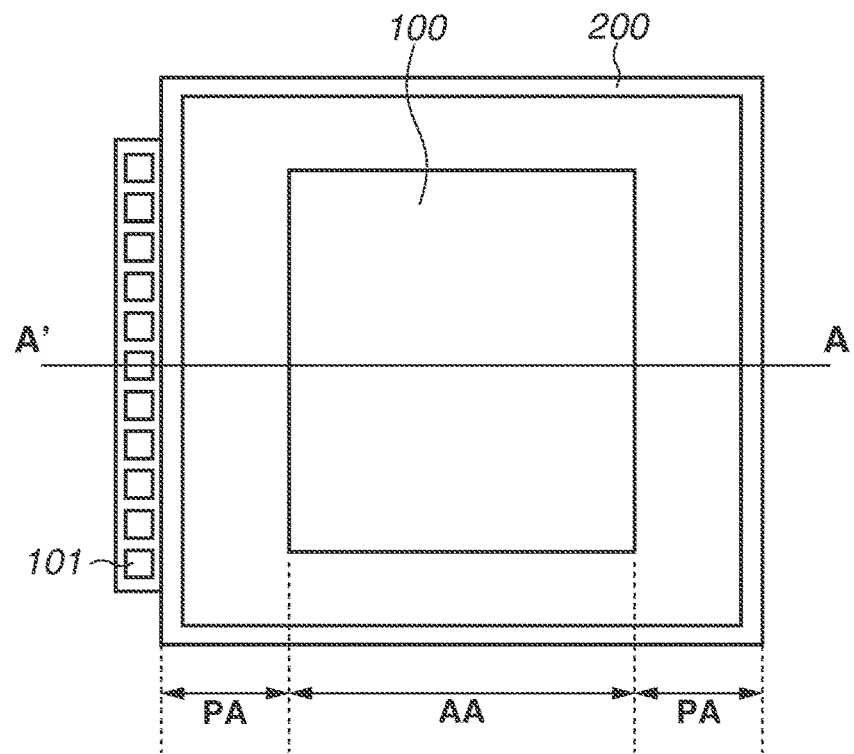
FIGS. 1A and 1B are plan views illustrating an electronic module according to a first exemplary embodiment of the present disclosure.

Exemplary embodiments according to the present disclosure will be described in detail below with reference to the accompanying drawings. The following exemplary embodiments do not limit the present disclosure within the scope of the appended claims. Although a plurality of features is described in the exemplary embodiments, not all of the plurality of features is indispensable to the present disclosure, and the plurality of features may be combined in an arbitrary way. In the accompanying drawings, identical or similar components are assigned the same reference numerals, and duplicated descriptions thereof will be omitted.

Figure 1B:
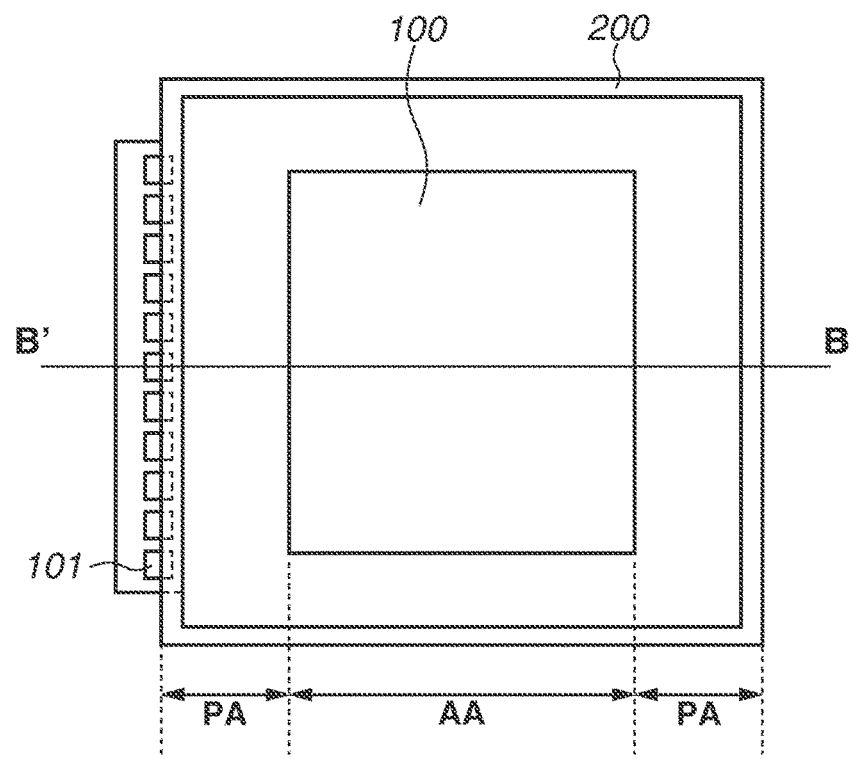
Figure 2A:
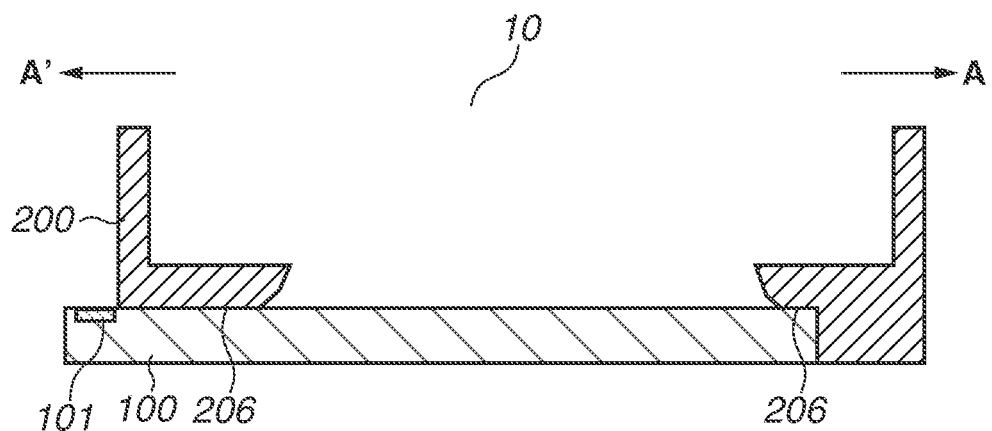
FIGS. 2A and 2B are cross-sectional views illustrating the electronic module according to the first exemplary embodiment of the present disclosure.
Figure 2B:
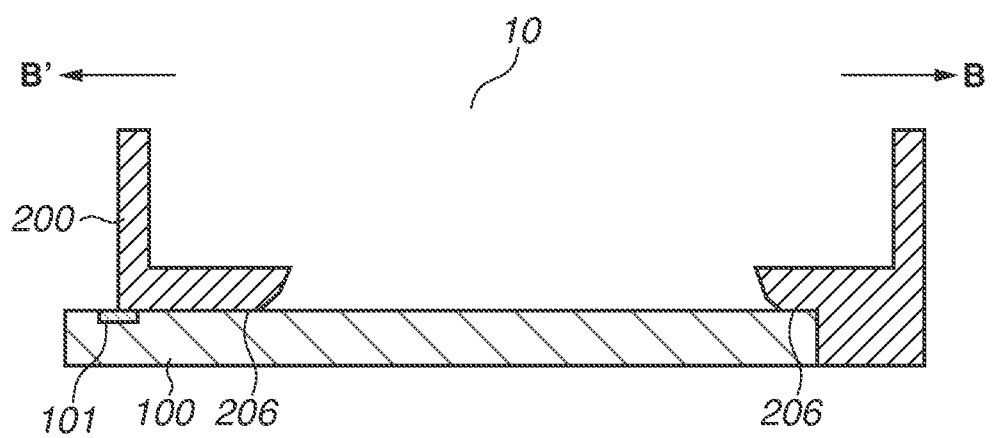
Figure 3A:
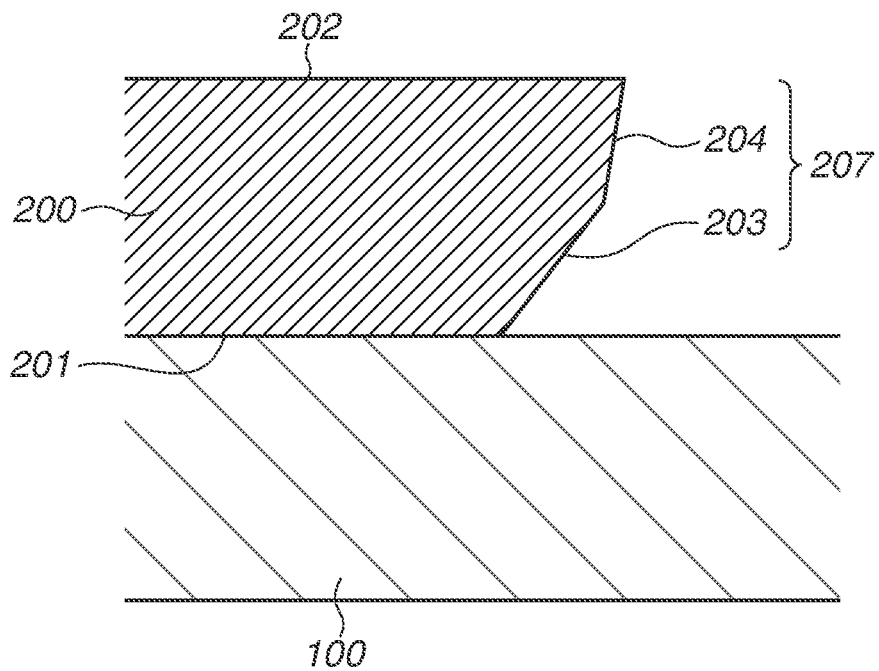
FIGS. 3A and 3B are cross-sectional views illustrating the electronic module according to the first exemplary embodiment of the present disclosure.
Figure 3B:
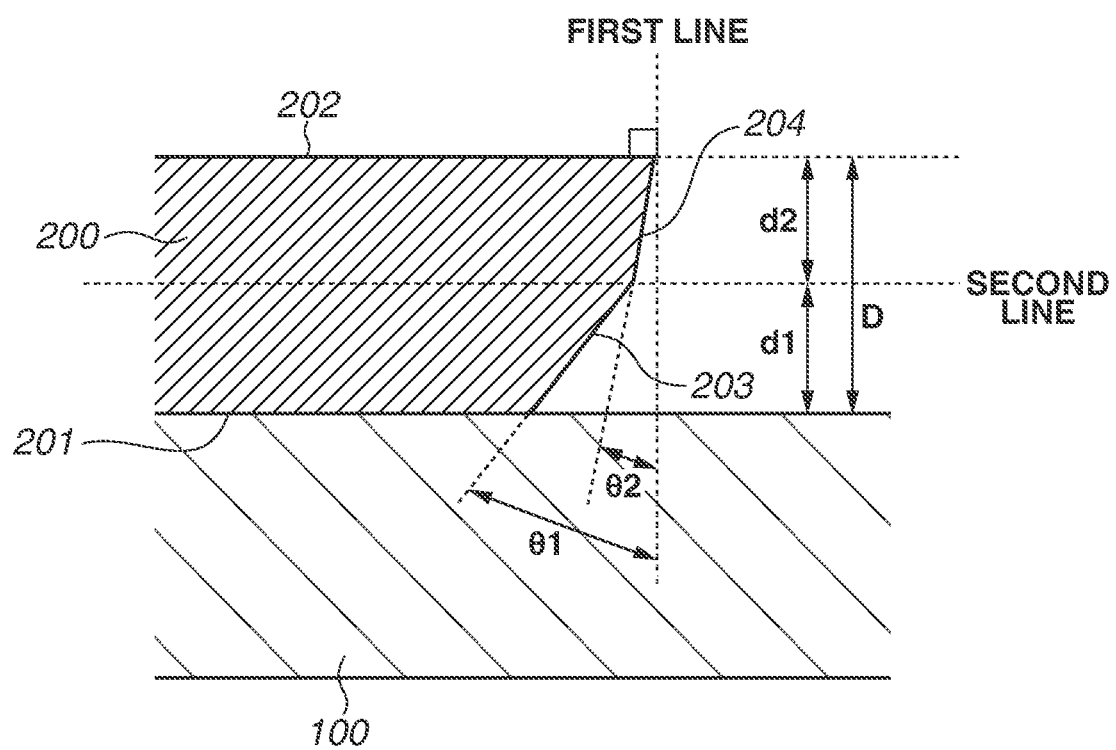
Figure 16:
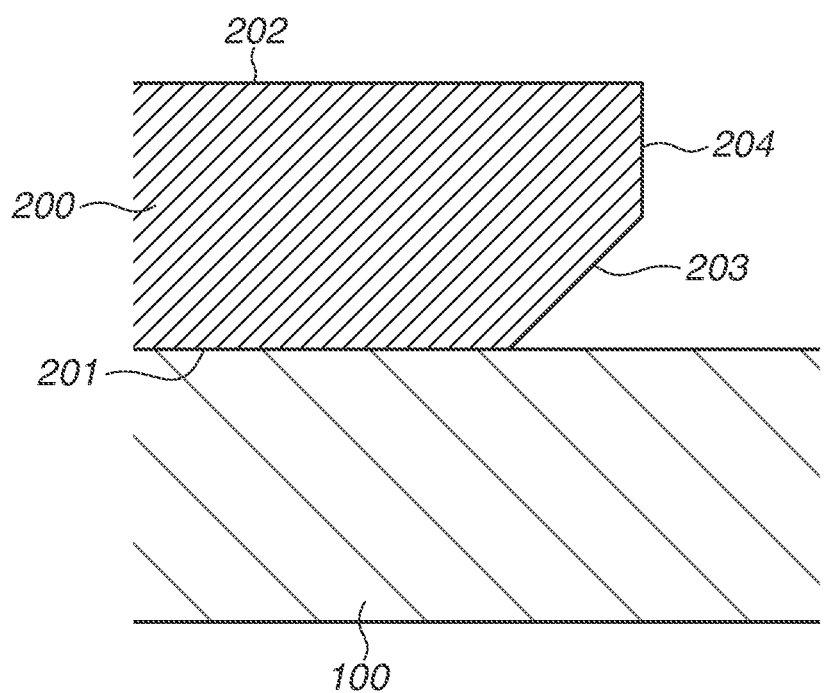
FIG. 16 is a cross-sectional view illustrating a comparative electronic module.

An electronic module according to a first exemplary embodiment will now be described with reference to FIGS. 1A to 3B and 16. FIGS. 1A and 1B are plan views illustrating an electronic module according to the present exemplary embodiment. FIG. 2A is a cross-sectional view taken along the line A-A' in FIG. 1A. FIG. 2B is a cross-sectional view taken along the line B-B' in FIG. 1B. FIGS. 3A and 3B are enlarged views of the FIGS. 2A and 2B, respectively. FIG. 16 is a cross-sectional view illustrating a comparative electronic module.

A first substrate 100 is provided with a display region AA and a peripheral region PA. As illustrated in FIGS. 1A and 1B, the first substrate 100 has a rectangular shape in the planar view. The shape of the first substrate 100 in the planar view may be a square or rectangle. At each corner between sides (side surfaces), certain edge portions may be chamfered. The display region AA on the first substrate 100 may be provided with a light emitting portion.

The first substrate 100 may also be provided with electrode portions 101. The electrode portions 101 may be provided on the outer circumference of the peripheral region PA in the planar view. As illustrated in FIG. 1B, the electrode portion 101 may be disposed such that at least a part thereof overlaps with the peripheral region PA. Disposing the electrode portion 101 such that at least a part thereof overlaps with the peripheral region PA enables reducing the size of the electronic module. In particular, disposing the electrode portion 101 on the peripheral region PA enables reducing the size of the electronic module.

A frame member 200 is disposed on the first substrate 100, as illustrated in FIGS. 1A and 1B. More specifically, the frame member 200 is disposed on the peripheral region PA of the first substrate 100. In the planar view, the frame member 200 having a rectangular cylindrical shape larger than the first substrate 100 is disposed to surround the display region AA. The material of the frame member 200 is not particularly limited but may be a light-absorption material or a liquid crystal polymer. Using these materials enables reducing the influence of external light.

As illustrated in FIGS. 2A and 2B, the frame member 200 includes an overlapping portion 206 overlapping with the first substrate 100. The overlapping portion 206 may be disposed to surround the display region AA.

As illustrated in FIGS. 3A and 3B, the frame member 200 includes a first surface 201 facing the first substrate 100, a second surface 202 facing the first surface 201, and an inner wall side surface 207 in contact with the first surface 201 and the second surface 202. More specifically, the inner wall side surface 207 is in contact with the first surface 201 and the second surface 202 and disposed on the side of the display region AA. The inner wall side surface 207 includes at least a first end face 203 in contact with the first surface 201, and a second end face 204 in contact with the second surface 202.

Referring to the cross-sectional view taken along lines on the first substrate 100 and the frame member 200, the electronic module according to the present exemplary embodiment has the first end face 203 and the second end face 204 as non-curved surfaces.

It is assumed that the normal line to the second surface 202 is a first line. More specifically, referring to the cross-sectional view taken along lines on the first substrate 100 and the frame member 200, it is assumed that the normal line to the second surface 202, passing through the point where the second surface 202 contacts the second end face 204 is the first line. In this case, the first line and the first end face 203 form an angle θ1, and the first line and the second end face 204 form an angle θ2. FIG. 3B is a cross-sectional view illustrating a relation between the angles θ1 and θ2 with reference to FIG. 3A.

In this case, the angles θ1 and θ2 are different. More specifically, θ1 is larger than or equal to 10 degrees, preferably larger than or equal to 20 degrees, or more preferably larger than 23 degrees. θ1 is less than or equal to 50 degrees or preferably less than or equal to 40 degrees. θ2 is larger than or equal to 2 degrees or preferably larger than 3 degrees. This is because this configuration enables preventing the friction between the mold and the frame member 200, enabling preventing projections from being formed on the second end face 204.

θ2 is less than or equal to 20 degrees and preferably less than or equal to 10 degrees. This is because this configuration enables maintaining the strength of the frame member 200.

If the first line and the second end face 204 form the angle θ2, the electronic module according to the present exemplary embodiment enables reducing projections formed on the second end face 204. The electronic module according to the present exemplary embodiment therefor enables preventing the degradation of the display image quality.

A comparative electronic module and the electronic module according to the present exemplary embodiment will be compared with reference to FIG. 16. With the comparative electronic module, the first line and the second end face 204 form no angle. In other words, the first line and the second end face 204 are in parallel. In such a configuration, a friction is likely to occur between the mold and the frame member 200 when the frame member 200 is being molded. As a result, projections are formed on the second end face 204, and the formed projections overlap with the display region AA, degrading the display image quality.

In contrast, with the electronic module according to the present exemplary embodiment, the first line and the second end face 204 form the angle θ2. In other words, the first line and the second end face 204 are not in parallel. In such a configuration, the friction between the mold and the frame member 200 can be reduced when the frame member 200 is being molded. This enables preventing projections from being formed on the second end face 204.

As described above, the electronic module according to the present exemplary embodiment enables preventing the degradation of the display image quality.

The electronic module according to the present exemplary embodiment preferably has the following configuration.

Referring to FIG. 3B, it is assumed that the line parallel to the second surface 202, passing through the point where the first end face 203 contacts the second end face 204 is a second line. In this case, in the vertical direction with respect to the second surface 202, the distance between the first surface 201 and the second line is a first distance d1, the distance between the second surface 202 and the second line is a second distance d2, and the distance between the first surface 201 and the second surface 202 is a distance D. FIG. 3B is a cross-sectional view illustrating the relations between the first distance d1, the second distance d2, and the distance D with reference to FIG. 3A.

The first distance d1, the second distance d2, and the distance D may be defined at the position where the distance D is maximized, at the position where the distance D is minimized, or at any other positions. For example, with the electronic module according to the present exemplary embodiment, the first surface 201 and the second surface 202 are disposed in parallel to each other, and thus the first distance d1, the second distance d2, and the distance D can be defined at any desired position.

In this case, with the electronic module according to the present exemplary embodiment, the second distance d2 preferably is larger than or equal to 10% of the distance D. This is because the second distance d2 equal to or larger than 10% of the distance D enables maintaining the strength of the frame member 200. More specifically, the second distance d2 may be larger than or equal to 10% and less than or equal to 90% of the distance D between the first surface 201 and the second surface 202, and may preferably be larger than or equal to 20% and less than or equal to 50% of the distant D.

In a case where the second distance d2 is large, it is preferable from a viewpoint of the strength of the frame member 200 itself. In a case where the first distance d1 is large, it is preferable because the irregular reflection due to stray light from the display region AA can be prevented. As a result of dedicated examination of these viewpoints by the inventors, the second distance d2 preferably is less than or equal to the first distance d1. More specifically, the second distance d2 preferably is larger than or equal to 25% and less than or equal to 50% of the first distance d1.

In this case, the electronic module according to the present exemplary embodiment enables preventing the degradation of the display image quality while maintaining the strength of the frame member 200.

Figure 4:
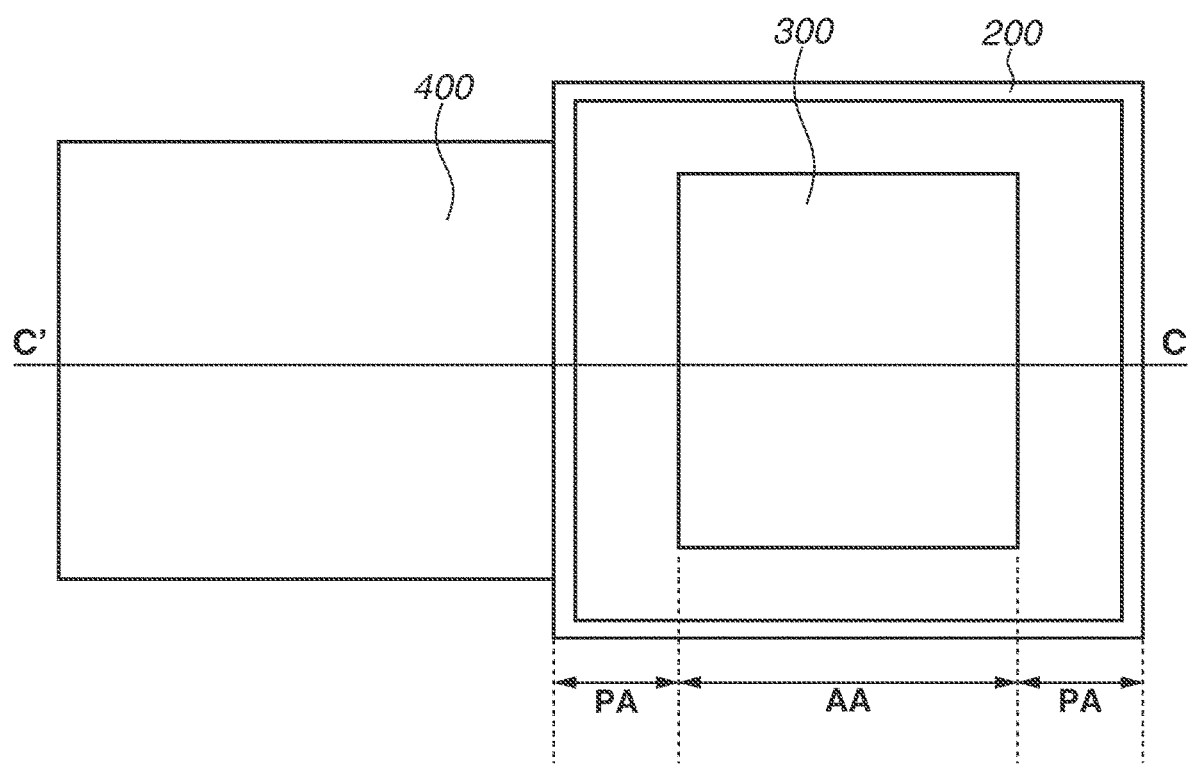
FIG. 4 is a plan view illustrating an electronic module according to a second exemplary embodiment of the present disclosure.
Figure 5:
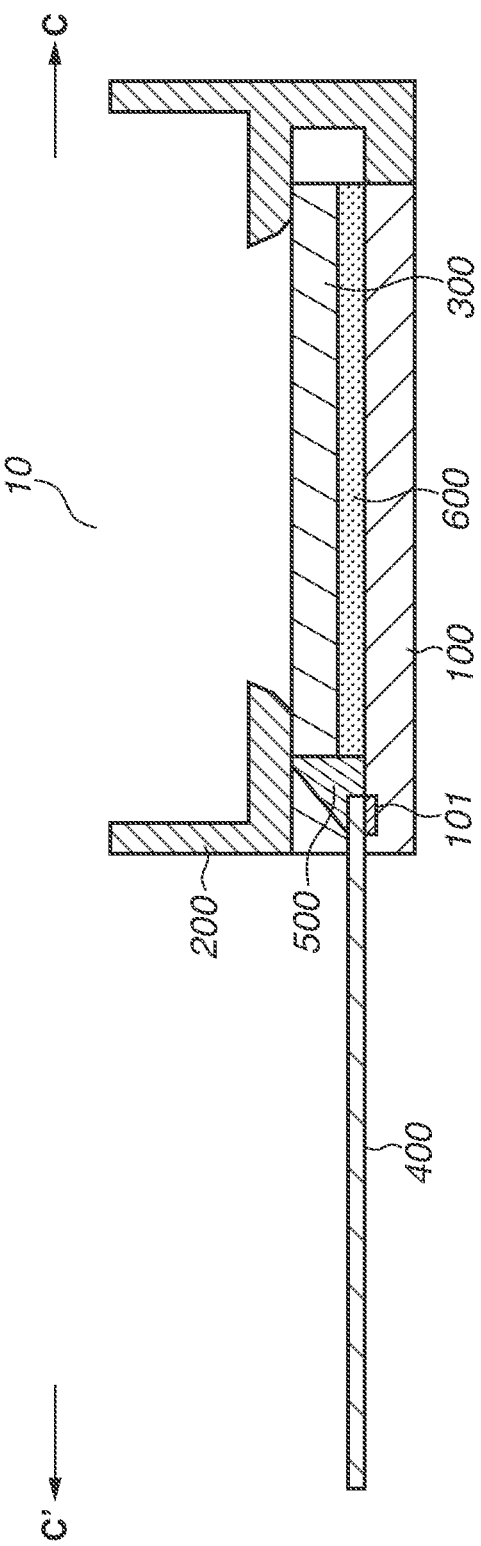
FIG. 5 is a cross-sectional view illustrating the electronic module according to the second exemplary embodiment of the present disclosure.
Figure 6:
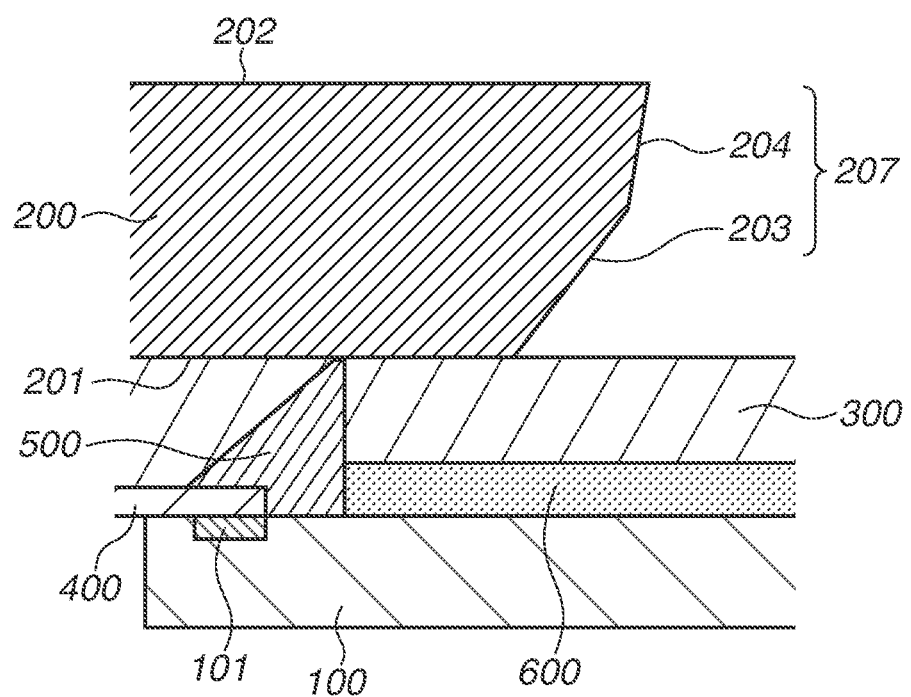
FIG. 6 is a cross-sectional view illustrating the electronic module according to the second exemplary embodiment of the present disclosure.

An electronic module according to a second exemplary embodiment will now be described with reference to FIGS. 4 to 6. FIG. 4 is a plan view illustrating the electronic module according to the second exemplary embodiment. FIG. 5 is a cross-sectional view taken along the line C-C' in FIG. 4. FIG. 6 is an enlarged view of the cross-sectional view in FIG. 5.

The electronic module according to the present exemplary embodiment differs from that according to the first exemplary embodiment in that the first substrate 100 and the second substrate 300 are in contact with each other via a bonding member 600, that the first substrate 100 and a third substrate 400 are in connect with each other via the electrode portion 101, and that a member is in contact with a side surface of the second substrate 300, a side surface of the bonding member 600, and a side surface of the third substrate 400.

According to the present exemplary embodiment, the second substrate 300 includes the display region AA and the peripheral region PA. The first substrate 100 may be a supporting substrate, and the second substrate 300 may be provided with a light emitting portion in the display region AA. The bonding member 600 is disposed on a first main surface of the first substrate 100, and the first substrate 100 and the second substrate 300 are bonded via the bonding member 600. The first main surface of the first substrate 100 faces the first surface 201 of the frame member 200.

The third substrate 400 is bonded to the electrode portion 101 of the first substrate 100. The third substrate 400 may be bonded to the electrode portion 101 via an Au bump, an anisotropic conductive film, or an anisotropic conductive paste. The third substrate 400 may be a wiring substrate such as a flexible printed circuit (FPC)substrate.

Referring to FIG. 6, the electronic module according to the present exemplary embodiment includes a member 500 disposed to cover at least a part of the first main surface of the first substrate 100, the side surface of the second substrate 300, the side surface of the bonding member 600, and the end portion of the third substrate 400. As a result, the electronic module according to the present exemplary embodiment provides high reliability of the connection between the electrode portion 101 of the first substrate 100 and the third substrate 400.

Referring to FIG. 6, the member 500 is disposed to cover at least a part of the first main surface of the first substrate 100, the side surface of the second substrate 300, the side surface of the bonding member 600, and the end portion of the third substrate 400. However, the present disclosure is not limited thereto. The member 500 may only be disposed to improve reliability of the connection between the electrode portion 101 and the third substrate 400. The member 500 is therefore disposed to cover at least a part of the first main surface of the first substrate 100 and the end portion of the third substrate 400. More preferably, the member 500 is disposed to cover at least a part of the first main surface of the first substrate 100, the side surface of the second substrate 300, the side surface of the bonding member 600, and the end portion of the third substrate 400. As a result, the electronic module according to the present exemplary embodiment provides high reliability of the connection between the electrode portion 101 of the first substrate 100 and the third substrate 400.

The member 500 is also referred to as a reinforcing member and, more specifically, may be made of an acrylic resin, an epoxy resin, or a silicone resin. The reinforcing member may be made of either a thermosetting resin or an ultraviolet curable resin and preferably is an ultraviolet curable resin. This is because, if the member 500 is made of a thermosetting resin, the reinforcing member may be heated and cured by the heat from the display region AA or by external sunlight.

With the electronic module according to the present exemplary embodiment, the above-described configuration enables improving reliability of the connection between the electrode portion 101 and the third substrate 400.

An electronic module according to a third exemplary embodiment will now be described with reference to FIGS. 7A to 7D. FIGS. 7A to 7D are cross-sectional views illustrating the electronic module according to the third exemplary embodiment. The electronic module according to the present exemplary embodiment differs from that according to the first exemplary embodiment in that the inner wall side surface 207 includes the first end face 203, the second end face 204, and a third end face 205 in contact with the first end face 203 and the second end face 204. In the present exemplary embodiment, only the third end face 205 is illustrated, but the electronic module according to the present exemplary embodiment may include a plurality of end faces such as a fourth end face between the first end face 203 and the second end face 204.

It is now assumed that the normal line to the second surface 202 is a first line. More specifically, referring to the cross-sectional view taken along lines on the first substrate 100 and the frame member 200, it is assumed that the normal line to the second surface 202, passing through the point where the second surface 202 contacts the second end face 204 is the first line. In this case, the first line and the first end face 203 form an angle $\theta 1$, the first line and the second end face 204 form an angle $\theta 2$, and the first line and the third end face 205 form an angle $\theta 3$.

It is also assumed that the line parallel to the second surface 202, passing through the point where the second end face 204 contacts the third end face 205 is a second line, and that the line parallel to the second surface 202, passing through the point where the third end face 205 contacts the first end face 203 is a third line. In this case, in the vertical direction with respect to the second surface 202, the distance between the first surface 201 and the third line is a first distance d1, the distance between the second surface 202 and the second line is a second distance d2, the distance between the second line and the third line is a third distance d3, and the distance between the first surface 201 and the second surface 202 is a distance D.

The first distance d1, the second distance d2, the third distance d3, and the distance D may be defined at the position where the distance D is maximized, at the position where the distance D is minimized, or at any other positions. For example, with the electronic module according to the present exemplary embodiment, the first distance d1, the second distance d2, the third distance d3, and the distance D can be defined at any desired point because the first surface 201 and the second surface 202 are disposed in parallel to each other.

Figure 7A:
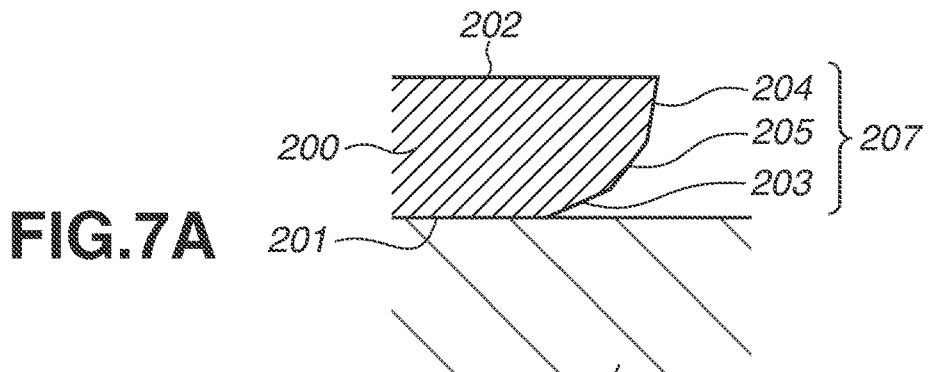
FIGS. 7A to 7D are cross-sectional views illustrating an electronic module according to a third exemplary embodiment of the present disclosure.
Figure 7B:
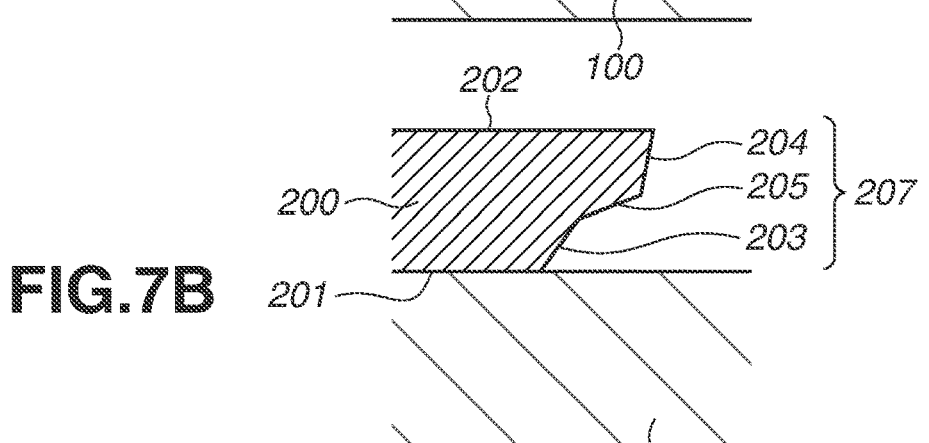
Figure 7C:
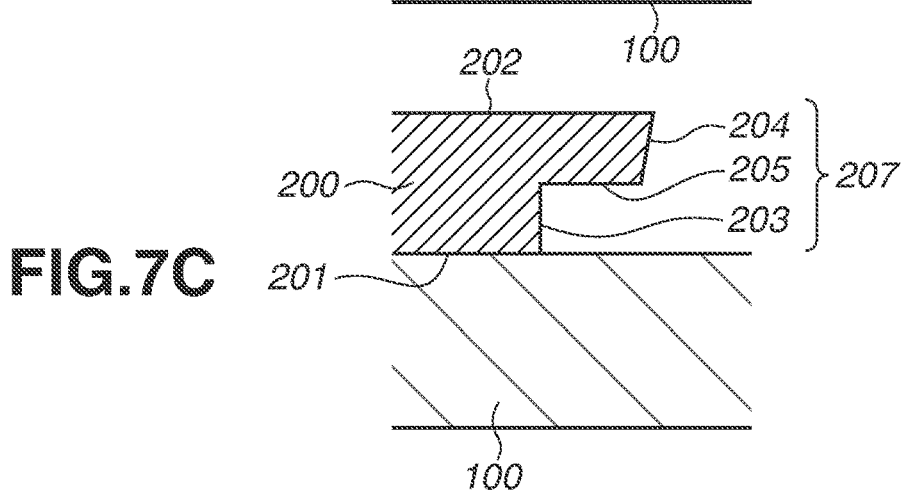
Figure 7D:
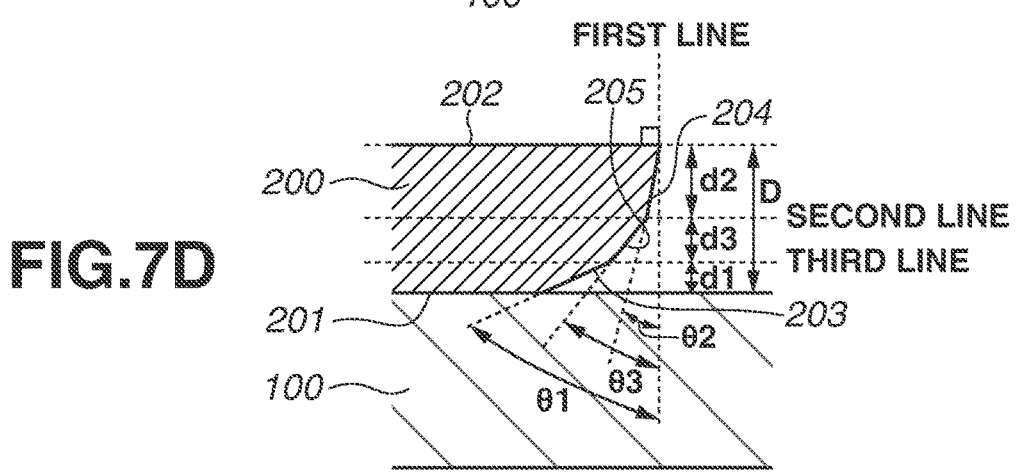

FIG. 7D illustrates relations between the angles θ1, θ2, and θ3, the first distance d1, the second distance d2, and the third distance d3 with reference to FIG. 7A.

In this case, the angles θ1, θ2, and θ3 are different from each other. For example, θ1 is larger than or equal to 2 degrees and less than or equal to 10 degrees, θ2 is larger than θ1 and less than or equal to 89 degrees, and θ3 is larger than 0 degrees and less than or equal to 89 degrees.

The first distance d1 is larger than or equal to 7% and less than or equal to 50%, preferably is larger than or equal to 10% and less than or equal to 50%, and more preferably is larger than or equal to 20% and less than or equal to 50% of the distance D. The second distance d2 is larger than or equal to 10% and less than or equal to 70% and preferably is larger than or equal to 10% and less than or equal to 50% of the distance D. The third distance d3 is larger than or equal to 0% and less than or equal to 70% and preferably is larger than or equal to 0% and less than or equal to 50% of the distance D. If the first distance d1 is larger than the second distance d2 and the third distance d3, the strength of the frame member 200 is improved and thus is preferable.

FIG. 7A illustrates a configuration in which the angles θ1, θ3, and θ2 are larger in this order. With the electronic module according to the present exemplary embodiment, such a configuration enables reducing the amount of the material for molding the frame member 200 while maintaining the strength of the frame member 200. As a result, the electronic module according to the present exemplary embodiment has a high strength and can be obtained at a low cost.

Referring to FIG. 7A, θ1 is larger than or equal to 20 degrees and preferably is larger than or equal to 50 degrees. θ1 is also less than or equal to 80 degrees and preferably is less than or equal to 70 degrees. θ2 is larger than or equal to 2 degrees and preferably is larger than 3 degrees. θ2 is also less than or equal to or 20 degrees and preferably is less than or equal to 10 degrees. θ3 is larger than or equal to 10 degrees and preferably is larger than or equal to 20 degrees. θ3 is also less than or equal to 60 degrees and preferably is less than or equal to 40 degrees.

FIG. 7B illustrates a configuration in which the angles θ3, θ1, and θ2 are larger in this order. With the electronic module according to the present exemplary embodiment, such a configuration enables reducing the amount of the material for molding the frame member 200. This means that the electronic module according to the present exemplary embodiment can be obtained at a low cost.

Referring to FIG. 7B, θ1 is larger than or equal to 10 degrees and preferably is larger than or equal to 20 degrees. θ1 is also less than or equal to 50 degrees and preferably is less than or equal to 40 degrees. θ2 is larger than or equal to 2 degrees and preferably is larger than 3 degrees. θ2 is also less than or equal to 20 degrees and preferably is less than or equal to 10 degrees. θ3 is larger than or equal to 20 degrees and preferably is larger than or equal to 40 degrees. θ3 is also less than or equal to 80 degrees and preferably is less than or equal to 70 degrees.

FIG. 7C illustrates a configuration in which the angles θ3, θ2, and θ1 are larger in this order. With the electronic module according to the present exemplary embodiment, such a configuration enables reducing the amount of the material for molding the frame member 200. This means that the electronic module according to the present exemplary embodiment can be obtained at a low cost.

Referring to FIG. 7C, θ1 may be, for example, 0 degrees. When θ1 is 0 degrees, since the first end face 203 is perpendicular to the second surface 202, projections may be formed on the first end face 203. However, with the electronic module according to the present exemplary embodiment, the first end face 203 is disposed more on the side of the peripheral region PA than the second end face 204 and the third end face 205, and therefor projections formed on the first end face 203 have a small influence on the display image quality. This means that the electronic module according to the present exemplary embodiment can be obtained at a low cost while preventing the degradation of the display image quality.

θ2 is larger than or equal to 2 degrees and preferably is larger than 3 degrees. θ2 is also less than or equal to 20 degrees and preferably is less than or equal to 10 degrees. θ3 may be larger than or equal to 80 degrees and less than or equal to 90 degrees or may be, for example, 90 degrees.

As described above, the electronic module according to the present exemplary embodiment can be obtained at a low cost while preventing the degradation of the display image quality.

Figure 8:
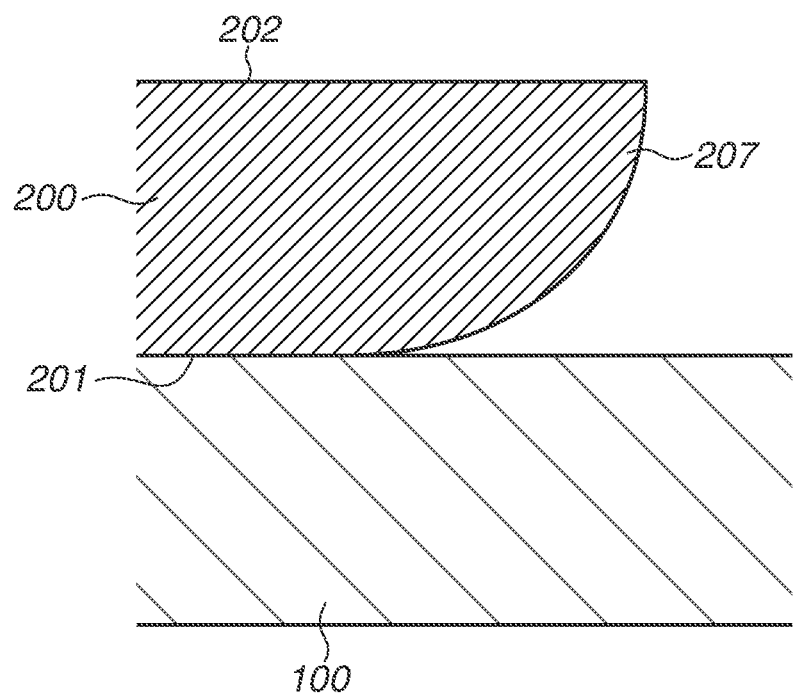
FIG. 8 is a cross-sectional view illustrating an electronic module according to a fourth exemplary embodiment of the present disclosure.

An electronic module according to a fourth exemplary embodiment will now be described with reference to FIG. 8. FIG. 8 is a cross-sectional view illustrating the electronic module according to the fourth exemplary embodiment. Referring to the cross-sectional view taken along lines on the first substrate 100 and the frame member 200, the electronic module according to the present exemplary embodiment differs from that according to the first exemplary embodiment in that the inner wall side surface 207 is a curved surface.

With the electronic module according to the present exemplary embodiment, the inner wall side surface 207 is a curved surface. In other words, this electronic module has no edge portion formed by end faces. Even with the electronic module according to the present exemplary embodiment, the friction between the mold and the frame member 200 can be reduced when the frame member 200 is being formed. This enables preventing projections from being formed on the inner wall side surface 207, preventing the degradation of the image quality.

As described above, the electronic module according to the present exemplary embodiment has no edge portion formed by end faces. With the electronic module according to the present exemplary embodiment, the material of the frame member 200 is therefor easier to be filled. This means that the present exemplary embodiment can prevent air bubbles from being formed in the frame member 200 in comparison with other exemplary embodiments described above. Accordingly, air bubbles in the frame member 200 enables preventing the irregular reflection due to stray light from the display region AA.

As described above, the electronic module according to the present exemplary embodiment enables preventing the degradation of the display image quality.

Figure 9A:
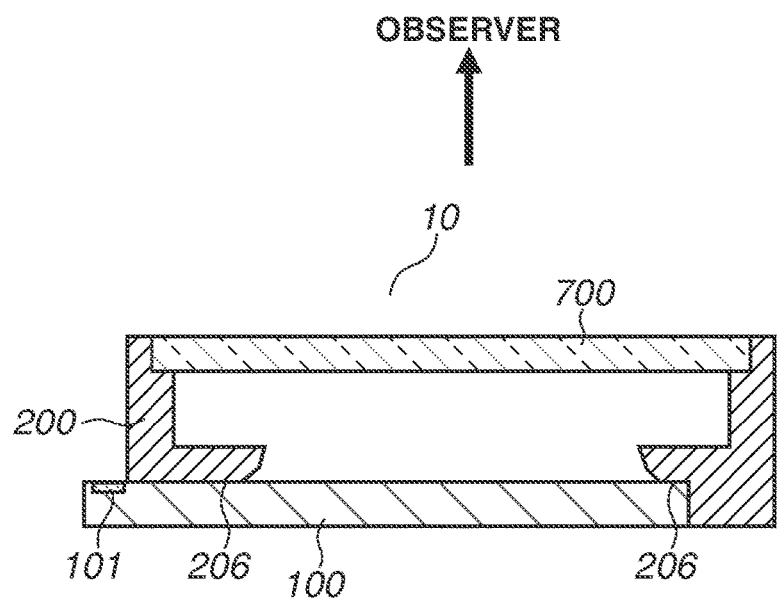
FIGS. 9A and 9B are cross-sectional views illustrating an electronic module according to a fifth exemplary embodiment of the present disclosure.
Figure 9B:
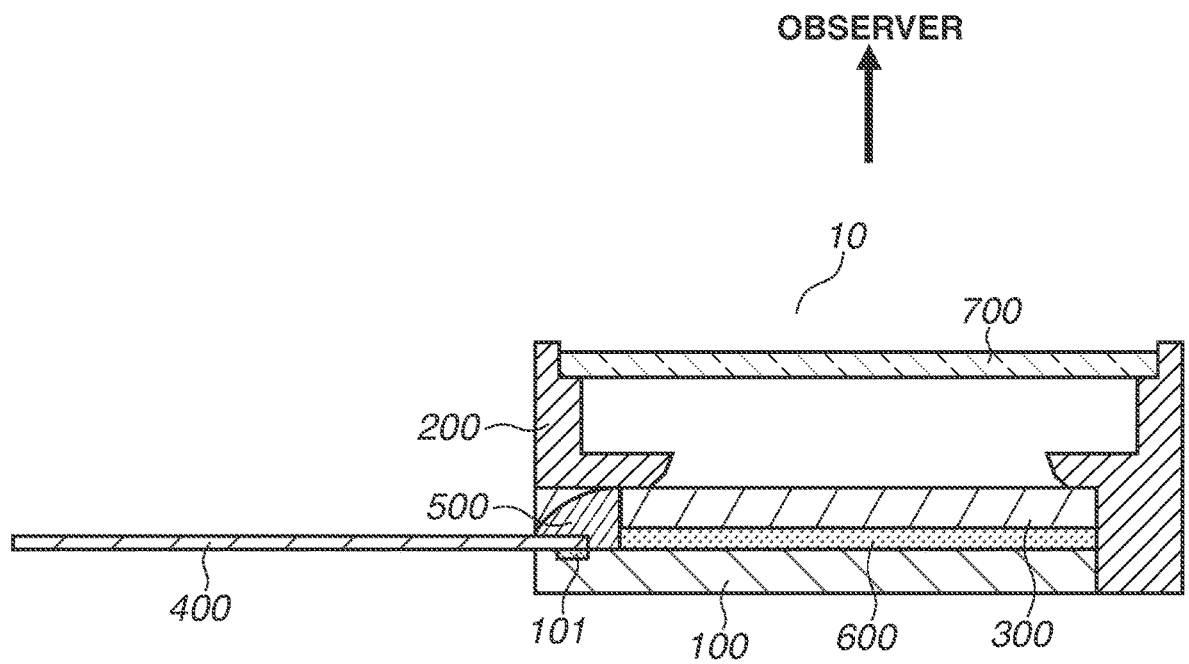

A electronic module according to a fifth exemplary embodiment will now be described. FIGS. 9A and 9B are cross-sectional views illustrating the electronic module according to the fifth exemplary embodiment.

The electronic module according to the present exemplary embodiment in FIG. 9A differs from that according to the first exemplary embodiment in that a light transmitting plate 700 facing the first substrate 100 is provided. The electronic viewfinder illustrated in FIG. 9A includes the light transmitting plate 700 facing the first substrate 100, making it possible to prevent outside foreign matters from entering the display region AA. The electronic module according to the present exemplary embodiment thereby enables preventing the degradation of the display image quality due to entry of foreign matters. This point also applies to FIG. 9B.

The electronic viewfinder according to the present exemplary embodiment may also include an optical member facing the first substrate 100 instead of the light transmitting plate 700. Referring to FIGS. 9A and 9B, the optical member may be disposed more on the upper side with respect to the substrate 100 than the light transmitting plate 700. More specifically, referring to FIGS. 9A and 9B, the optical member may be disposed more on the observer side than the light transmitting plate 700. More specifically, the optical member is a lens or prism. Disposing an optical member facing the first substrate 100 instead of the light transmitting plate 700 enables preventing entry of foreign matters. This configuration thereby enables preventing the degradation of the display image quality due to entry of foreign matters.

The electronic viewfinder according to the present exemplary embodiment may include the light transmitting plate 700 and an optical member at the same time. With such a configuration, the light transmitting plate 700 can prevent entry of foreign matters, and the optical member enables preventing the degradation of the display image quality due to external light.

A display apparatus, an imaging apparatus, an electronic device, a wearable device, and an image forming apparatus using the electronic module according to the present exemplary embodiment will be described below with reference to FIGS. 10 to 15D.

Figure 10:
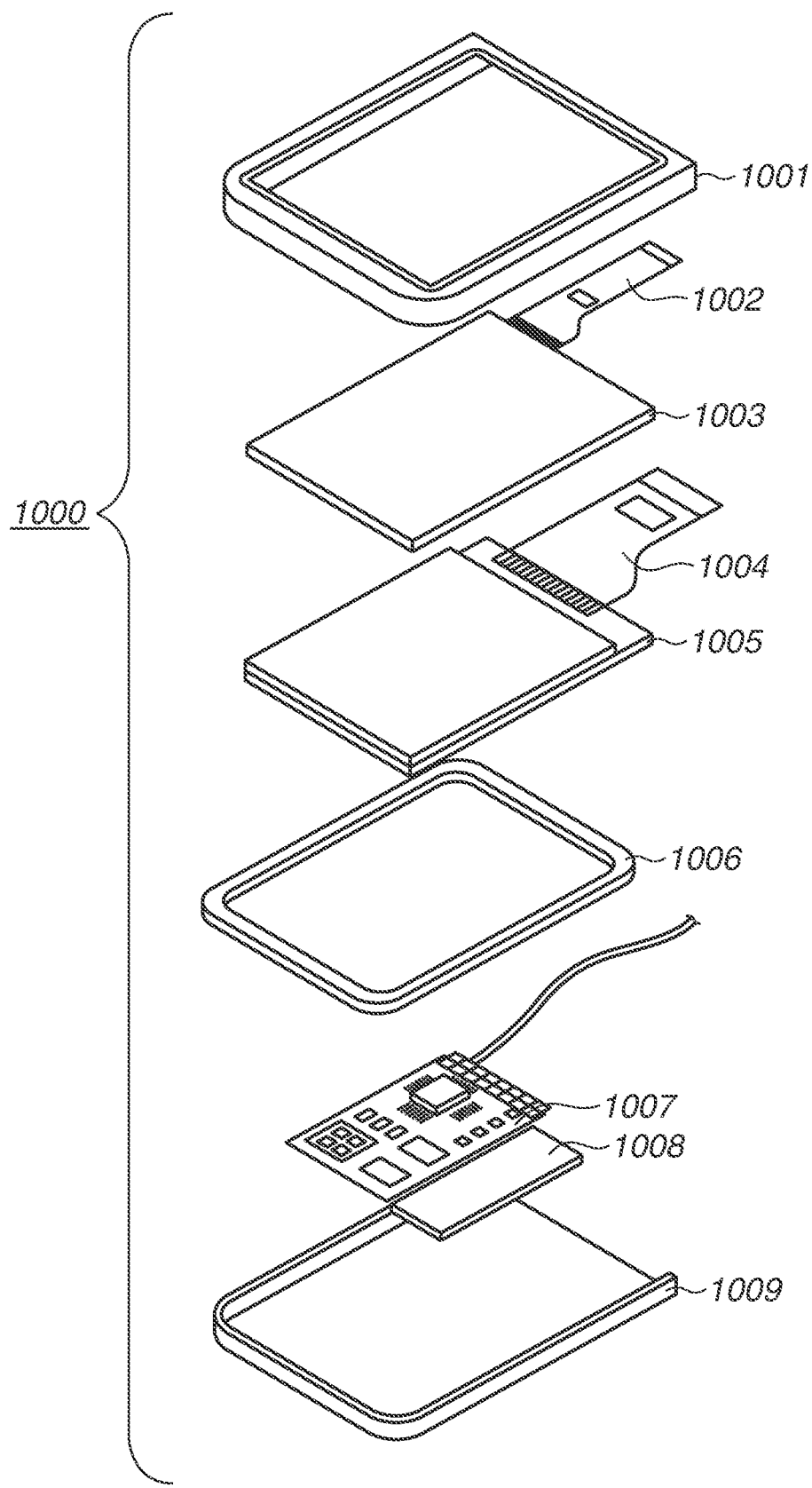
FIG. 10 schematically illustrates an example of a display apparatus according to an exemplary embodiment of the present disclosure.

FIG. 10 schematically illustrates an example of a display apparatus according to the present exemplary embodiment. A display apparatus 1000 may include a touch panel 1003, a display panel 1005, a frame 1006, a circuit substrate 1007, and a battery 1008 between the top cover 1001 and the bottom cover 1009.

The touch panel 1003 and the display panel 1005 are connected with an FPC 1002 and an FPC 1004, respectively. The display panel 1005 may include the electronic module according to the present exemplary embodiment. To circuit substrate 1007 mounts transistors printed thereon. The battery 1008 may be omitted if the display apparatus is not a portable apparatus, or may be disposed at another position if the display apparatus is a portable apparatus.

The display apparatus according to the present exemplary embodiment may include color filters having red, green, and blue colors. The red, green, and blue colors of the color filters may be arranged in a delta array.

The display apparatus according to the present exemplary embodiment may be used for the display unit of an imaging apparatus having a light-receiving image sensor. The imaging apparatus may include a display unit for displaying information captured by the image sensor. The display unit may be exposed out of the imaging apparatus or disposed inside the viewfinder. The imaging apparatus may be a digital camera or digital video camera.

Figure 11A:
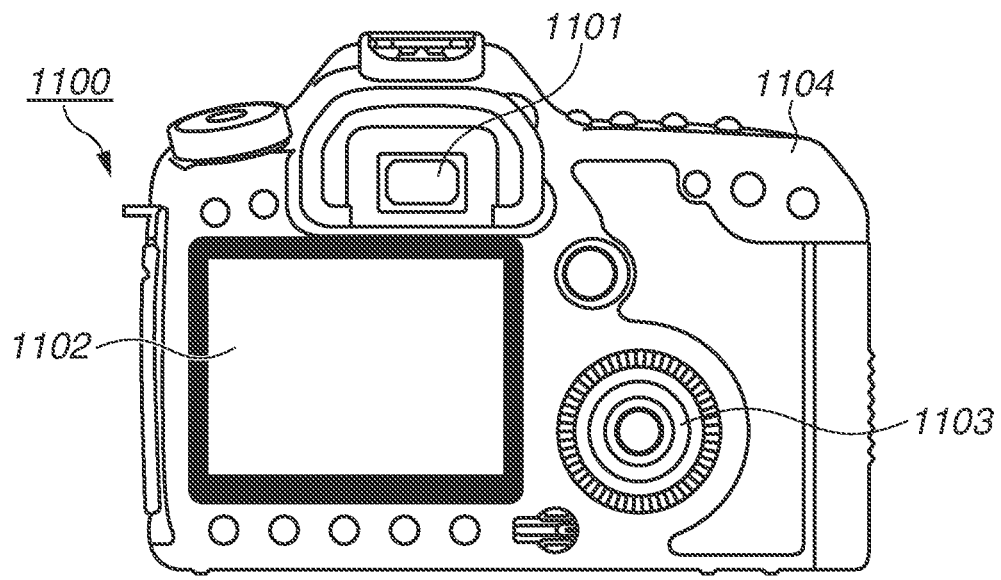
FIG. 11A schematically illustrates an example of an imaging apparatus according to an exemplary embodiment of the present disclosure.

FIG. 11A schematically illustrates an example of an imaging apparatus according to the present exemplary embodiment. An imaging apparatus 1100 may include a viewfinder 1101, a back panel display 1102, an operation unit 1103, and a housing 1104. The viewfinder 1101 and the back panel display 1102 may include the electronic module according to the present exemplary embodiment. In such a case, the display apparatus may display not only captured images but also environmental information and imaging instructions. The environmental information includes an intensity of external light, an orientation of external light, a moving speed of a subject, and possibility that the subject is shielded by a shielding.

The imaging apparatus 1100 may further include an optical unit (not illustrated). The optical unit may include a single lens or a plurality of lenses for forming an image on the image sensor stored in the housing 1104. The plurality of lenses is capable of adjusting focus by adjusting relative positions of the lenses. This operation can also be automatically performed. The imaging apparatus may also be called a photoelectric conversion apparatus. The photoelectric conversion apparatus may have imaging methods including a method for detecting a difference from a previous image and a method for clipping an image from constantly recorded images, instead of a method for performing successive image capturing.

Figure 11B:
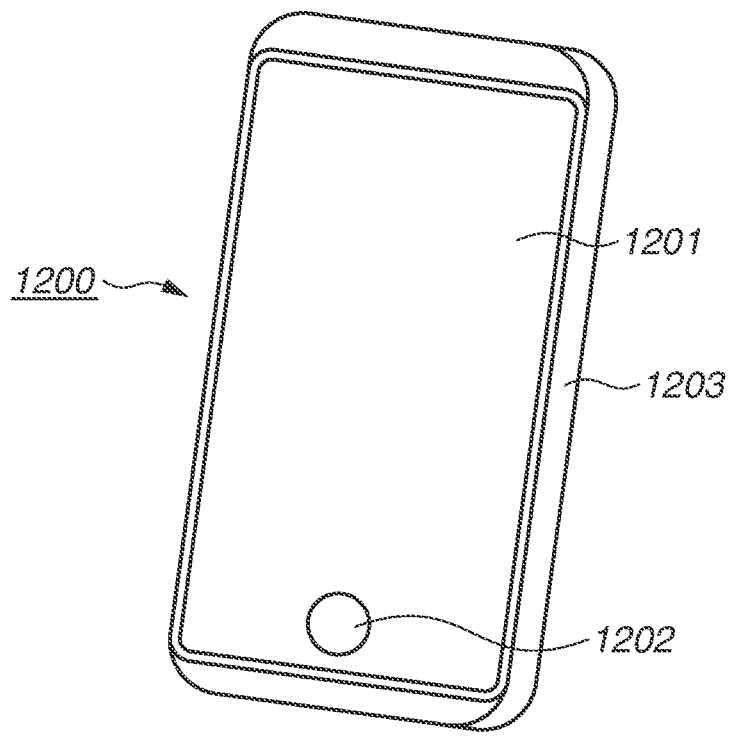
FIG. 11B schematically illustrates an example of an electronic apparatus according to an exemplary embodiment of the present disclosure.

FIG. 11B schematically illustrates an example of an electronic apparatus according to the present exemplary embodiment. An electronic apparatus 1200 includes a display unit 1201, an operation unit 1202, and a housing 1203. The housing 1203 may include a circuit, a printed circuit substrate mounting the circuit, a battery, and a communication unit. The operation unit 1202 may be a button or a touch-sensitive response unit. The operation unit 1202 may be a biometric recognition unit for recognizing a fingerprint to unlock the operation unit 1202. The electronic apparatus 1200 having a communication unit may be considered as a communication apparatus. The electronic apparatus 1200 including a lens and an image sensor may be further provided with a camera function. An image captured by the camera function is displayed on the display unit 1201. Examples of the electronic apparatus 1200 includes a smart phone and a notebook personal computer.

Figure 12A:
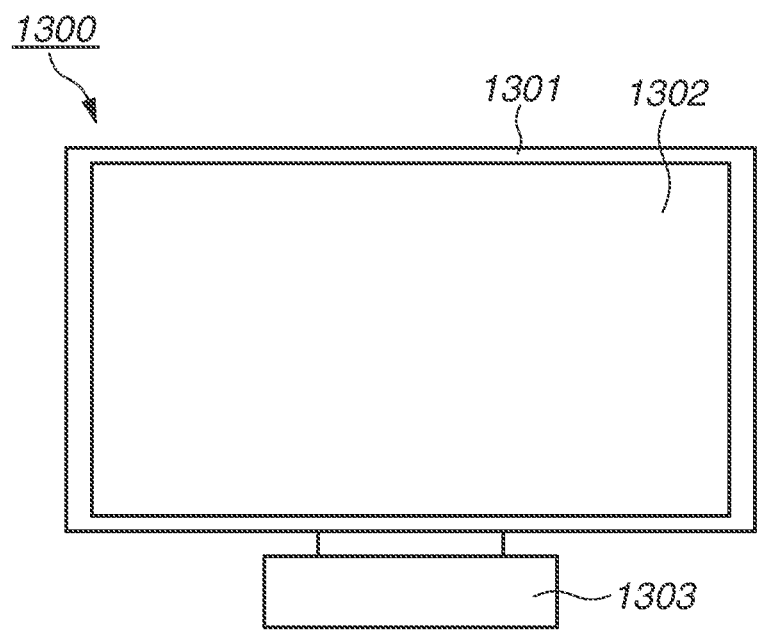
FIG. 12A schematically illustrates an example of a display apparatus according to an exemplary embodiment of the present disclosure.
Figure 12B:
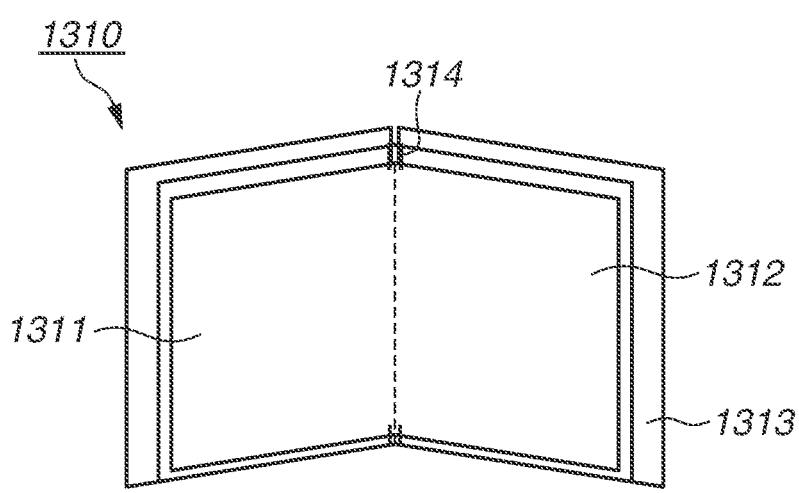
FIG. 12B schematically illustrates an example of a foldable display apparatus.

FIGS. 12A and 12B schematically illustrate examples of display apparatuses according to the present exemplary embodiment. FIG. 12A illustrates a display apparatus, such as a television monitor and a personal computer (PC) monitor. A display apparatus 1300 includes a housing 1301 and a display unit 1302. An organic device according to the present disclosure may be used for the display unit 1302.

The display apparatus 1300 may be further provided with a base 1303 for supporting the housing 1301 and the display unit 1302. The base 1303 is not limited to the form illustrated in FIG. 12A. The bottom side of the housing 1301 may serve as a base 1303.

The housing 1301 and the display unit 1302 may be curved. The curvature radius may be larger than or equal to 5,000 mm and less than or equal to 6000 mm.

FIG. 12B schematically illustrates another example of a display apparatus according to the present exemplary embodiment. Referring to FIG. 12B, a display apparatus 1310 configured to be foldable is what is called a foldable display apparatus. The display apparatus 1310 includes a first display unit 1311, a second display unit 1312, a housing 1313, and a folding point 1314. The first display unit 1311 and the second display unit 1312 may include the organic device according to the present disclosure. The first display unit 1311 and the second display unit 1312 may be a single seamless display apparatus. The first display unit 1311 and the second display unit 1312 can be separated at the folding point 1314. The first display unit 1311 and the second display unit 1312 may display different images or display one image together with each other.

Figure 13A:
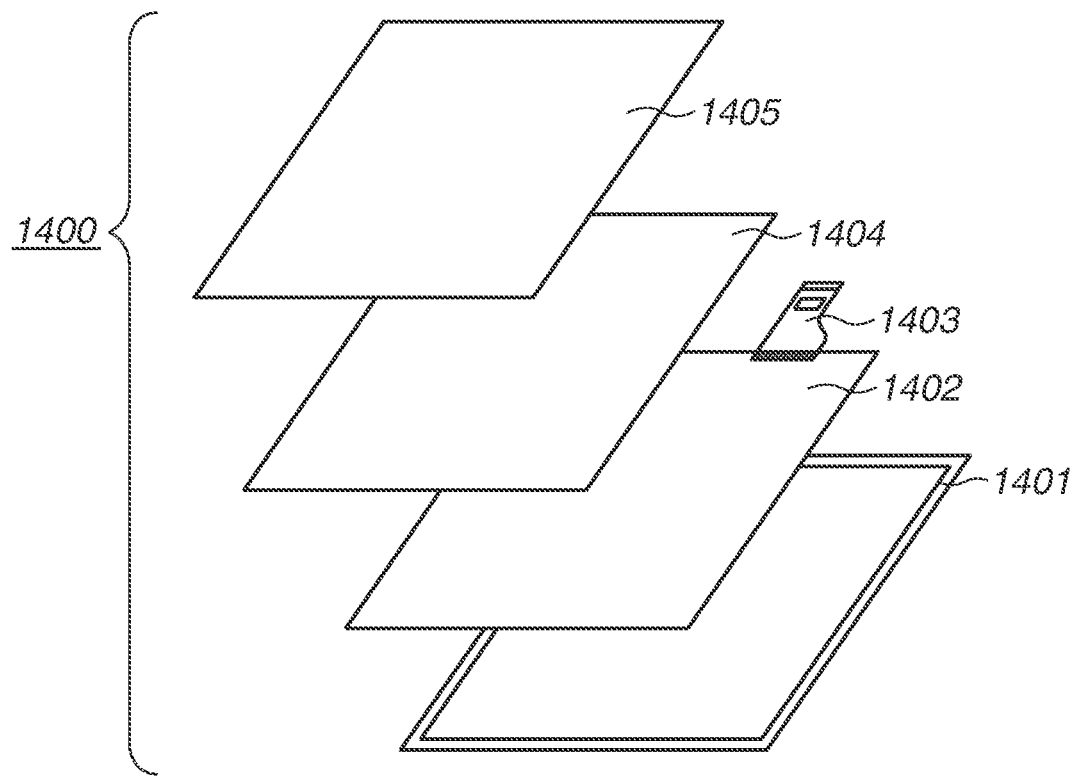
FIG. 13A schematically illustrates an example of an illumination apparatus according to an exemplary embodiment of the present disclosure.

FIG. 13A schematically illustrates an example of an illumination apparatus according to the present exemplary embodiment. An illumination apparatus 1400 may include a housing 1401, a light source 1402, and a circuit substrate 1403. The light source 1402 may include an electronic module according to the present exemplary embodiment. The illumination apparatus 1400 may include an optical film 1404 to improve the color rendering of the light source 1402. The illumination apparatus 1400 may also include a light diffusion unit 1405 to effectively scatter light of the light source 1402. The illumination apparatus 1400 including the light diffusion unit 1405 can deliver light to a wide range. The optical film 1404 and the light diffusion unit 1405 may be disposed on the light emission side of the illumination apparatus 1400. A cover may be provided at the outermost portion as required.

The illumination apparatus 1400 is, for example, an apparatus for illuminating a room. The illumination apparatus 1400 may emit white light, daytime white light, and any other light ranging from blue to red. The illumination apparatus 1400 may include a light modulation circuit for modulating light. The illumination apparatus 1400 may include a power source circuit for converting an alternating current (AC) voltage to a direct current (DC) voltage. White light has a color temperature of 4200K, and daytime white light has a color temperature of 5000K. The illumination apparatus 1400 may include color filters.

The illumination apparatus 1400 according to the present exemplary embodiment may include a heat radiation unit. The heat radiation unit made of a metal or ceramic having a large heat conductivity radiates heat developed in the apparatus out of the apparatus.

Figure 13B:
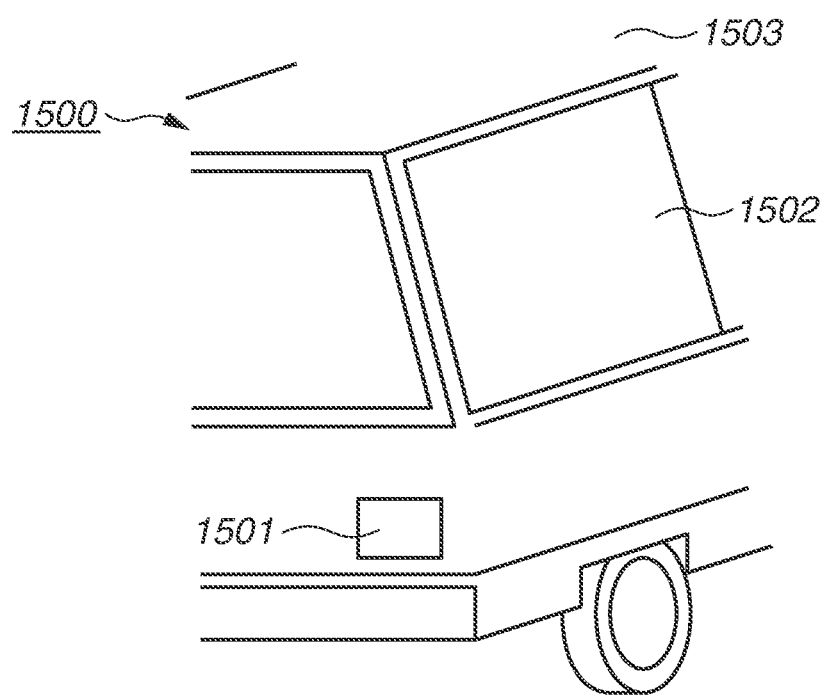
FIG. 13B schematically illustrates an example of an automobile having a vehicle lamp fitting according to an exemplary embodiment of the present disclosure.

FIG. 13B schematically illustrates an automobile as an example of a moving body according to the present exemplary embodiment. The automobile includes a tail lamp as an example of a lamp fitting. The automobile 1500 may be provided with a tail lamp 1501 that lights up when a brake operation is made. The automobile 1500 may include a car body 1503 and a window 1502 attached to the car body 1503.

The tail lamp 1501 may include the electronic module according to the present exemplary embodiment. The tail lamp 1501 may include a protection member for protecting a light source. The protection member may be made of any transparent material having a high strength to a certain extent. The protection member is preferably made of polycarbonate. A flange carboxylic acid derivative or an acrylonitrile derivative may be mixed with polycarbonate.

Examples of the moving body according to the present exemplary embodiment include an automobile, a ship, an aircraft, and a drone. The moving body may include a main frame and a lamp fitting attached to the main frame. The lamp fitting may emit light to inform of the position of the main frame.

The electronic apparatus or the display apparatus is applicable to a system wearable as a wearable device, such as smart glasses, a head mount display, and a smart contact. The electronic apparatus may include an imaging apparatus capable of photoelectrically converting visible light, and a display apparatus capable of emitting visible light.

Figure 14A:
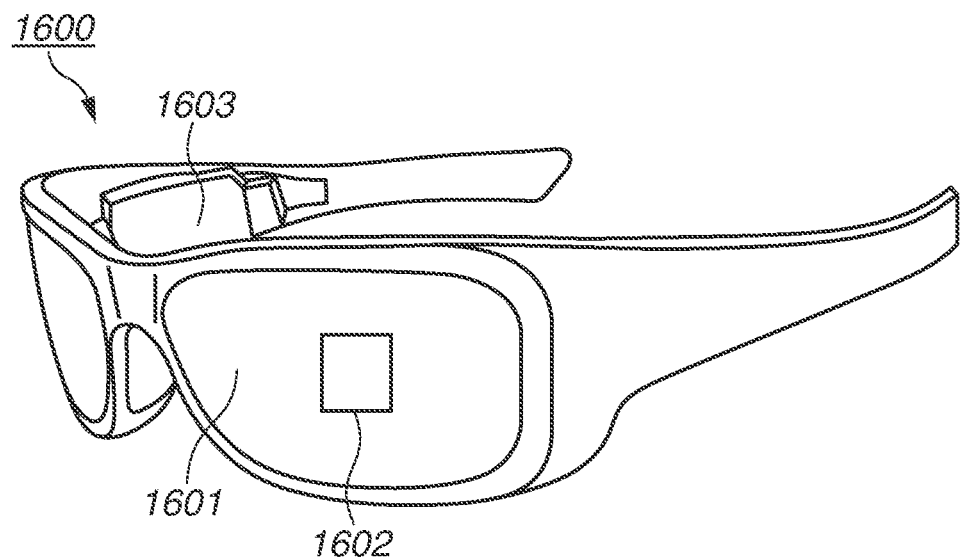
FIG. 14A schematically illustrates an example of a wearable device according to an exemplary embodiment of the present disclosure.
Figure 14B:
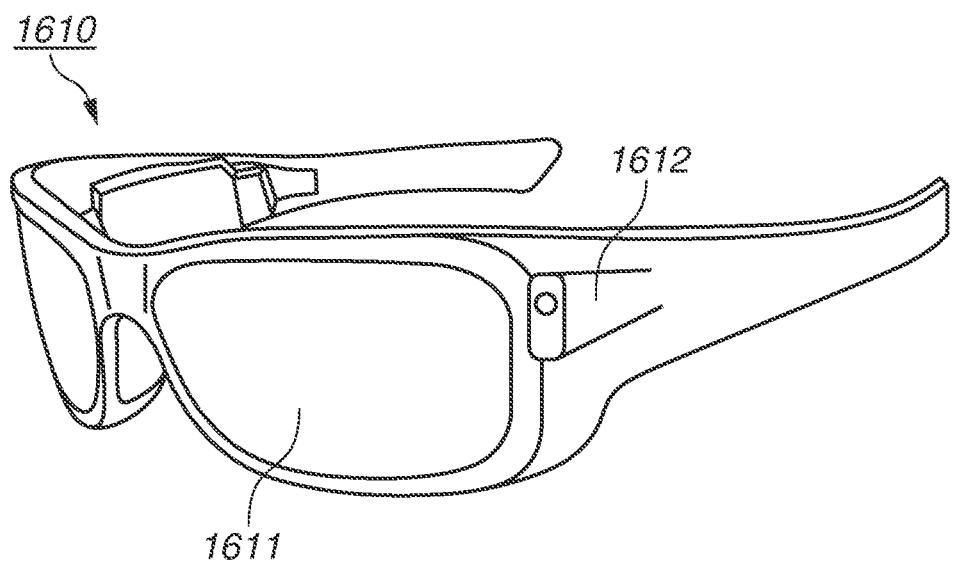
FIG. 14B schematically illustrates an example of a wearable device having an imaging apparatus according to an exemplary embodiment of the present disclosure.

FIGS. 14A and 14B schematically illustrate examples of wearable devices (smart glasses) according to the present exemplary embodiment. Glasses 1600 (smart glasses) will now be described with reference to FIG. 14A. The glasses 1600 are provided with a display unit on the back side of a lens 1601. The display unit may include the electronic module according to the present exemplary embodiment. An imaging unit 1602, such as a complementary metal oxide semiconductor (CMOS) sensor and a single photon avalanche diode (SPAD), may also be provided on the front side of the lens 1601.

The glasses 1600 further include a control unit 1603 which functions as a power source for supplying power to the imaging unit 1602 and the display unit. The control unit 1603 controls the operations of the imaging unit 1602 and the display unit. An optical system is formed on the lens 1601 for focusing light on the imaging unit 1602 and the display unit.

Glasses 1610 (smart glasses) will now be described with reference to FIG. 14B. The glasses 1610 include a control unit 1612 that is provided with a display unit having the electronic module according to the present exemplary embodiment. The control unit 1612 may further include an imaging apparatus equivalent to the imaging unit 1602. An optical system for projecting the light emitted from the control unit 1612 is formed on a lens 1611 on which an image is projected. The control unit 1612 functions as a power source for supplying power to the imaging apparatus and the display apparatus, and controls operations of the imaging apparatus and the display apparatus. The control unit 1612 may include a line-of-sight detection unit for detecting the line of sight of the user wearing the glasses 1610. Infrared radiation may be used to detect the line of sight. An infrared radiation emission unit emits infrared radiation to an eyeball of the user closely watching the displayed image. When the imaging unit having a light detecting element detects reflected light from the eyeball out of the emitted infrared radiation, a captured image of the eyeball is obtained.

If a reduction unit for reducing light from the infrared radiation emission unit to the display unit in the planar view is provided, it is possible to reduce the degradation of the image quality.

The control unit 1612 detects the line of sight of the user with respect to the displayed image by using the captured image of the eyeball obtained through image capturing with infrared radiation. Any desired known technique is applicable to the line-of-sight detection using the captured image of the eyeball. Examples of applicable methods include a line-of-sight detection method based on a Purkinje image by using the illumination light reflection on the cornea.

More specifically, line-of-sight detection processing based on a pupillary cornea reflection method is performed. The line of sight of the user is detected by using the pupillary cornea reflection method, more specifically, by calculating a line-of-sight vector representing the orientation (rotational angle) of the eyeball based on a pupillary image and Purkinje image included in the captured image of the eyeball.

The wearable device according to an exemplary embodiment according to the present disclosure may include an imaging apparatus having a light detecting element and control a displayed image of the display apparatus based on user's line-of-sight information from the imaging apparatus.

More specifically, the display apparatus determines, based on the line-of-sight information, a first visual field region closely watched by the user and a second visual field region other than the first visual field region. The first and the second visual field regions may be determined by the control apparatus of the display apparatus. Alternatively, the display apparatus may receive the first and the second visual field regions determined by an external control apparatus. In the display region of the display apparatus, the display resolution of the first visual field region may be controlled to be higher than the display resolution of the second visual field region. More specifically, the resolution of the second visual field region may be lower than the resolution of the first visual field region.

In order to determine the first display region and a high-priority display region, an artificial intelligence (AI) may be used. The AI is a model that is configured to estimate the angle of the line of sight and the distance to an object in front of the line of sight based on the eyeball image by using teacher data. The teacher data includes an eyeball image and the direction of the actual line of sight of the eyeball image. The display apparatus, the imaging apparatus, or an external apparatus may include the AI. If an external apparatus includes the AI, the AI can be preferably applied to the smart glasses further including the imaging apparatus for capturing an outside image. The smart glasses can display captured external information in real time.

Figure 15A:
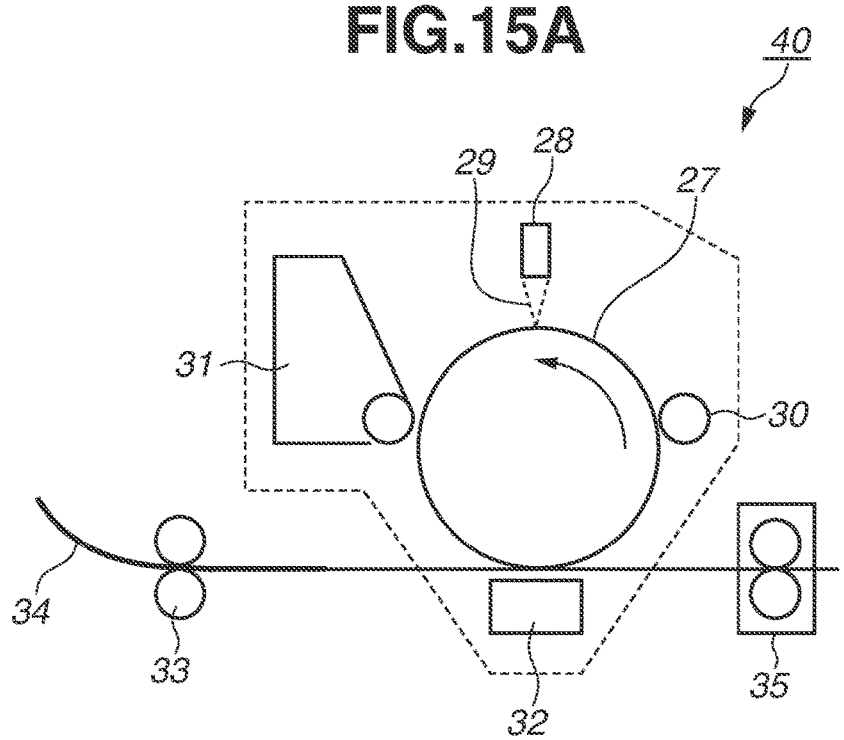
FIG. 15A schematically illustrates an example of an image forming apparatus according to an exemplary embodiment of the present disclosure.

FIG. 15A schematically illustrates an example of an image forming apparatus according to the present exemplary embodiment. An image forming apparatus 40 is an electrophotographic image forming apparatus including a photosensitive member 27, an exposure light source 28, a charging unit 30, a developing unit 31, a transfer unit 32, a conveyance roller 33, and a fixing unit 35. When the exposure light source 28 emits light 29, an electrostatic latent image is formed on the surface of the photosensitive member 27. The exposure light source 28 may include the electronic module according to the present exemplary embodiment. The developing unit 31 include a toner. The charging unit 30 charges the photosensitive member 27. The transfer unit 32 transfers a developed image to a recording medium 34. A conveyance roller 33 conveys the recording medium 34 (e.g., paper). The fixing unit 35 fixes the image formed on the recording medium 34.

Figure 15B:
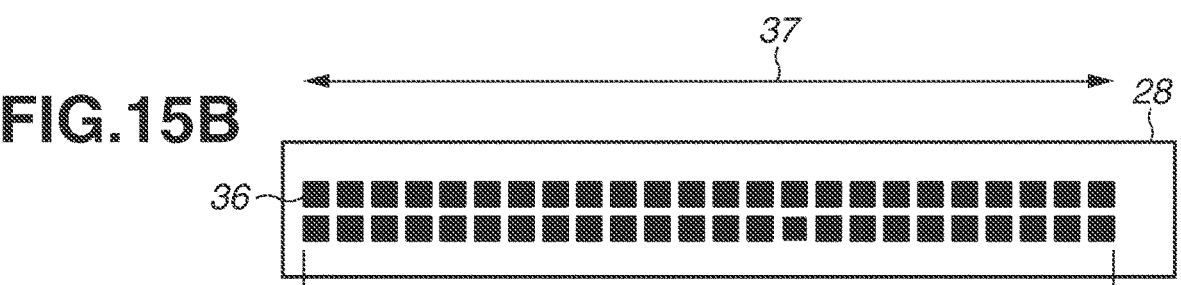
FIG. 15B schematically illustrates an example of an exposure light source of the image forming apparatus according to an exemplary embodiment of the present disclosure.
Figure 15C:
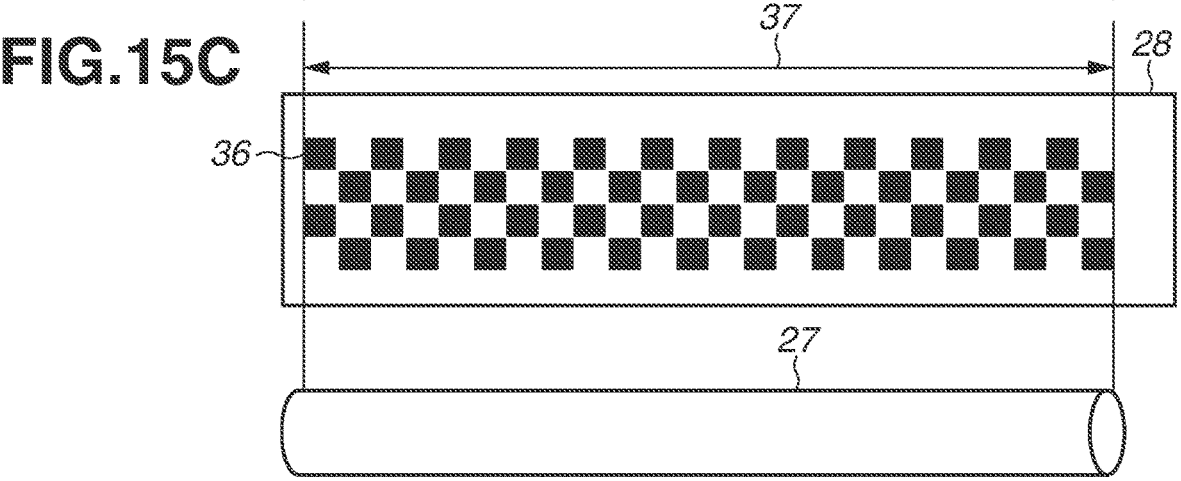
FIG. 15C schematically illustrates another example of an exposure light source of the image forming apparatus according to an exemplary embodiment of the present disclosure.

FIGS. 15B and 15C schematically illustrate the exposure light source 28 which includes a plurality of light emitting elements 36 arranged on an oblong substrate. The arrow 37 indicates the column direction in which organic light emitting elements are arranged. This column direction is the same as the axial direction around which the photosensitive member 27 rotates. This direction is also referred to as a long axial direction of the photosensitive member 27. FIG. 15B illustrates a state where the light emitting elements 36 are arranged along the long axial direction of the photosensitive member 27. FIG. 15C illustrates a form different from the form in FIG. 15B, more specifically, a state where the light emitting elements 36 are alternately arranged in the column direction in each of a first and a second column. The first and the second columns are arranged at different positions in the row direction.

The first column includes a plurality of light emitting elements 36 arranged at certain intervals. The second column includes light emitting elements 36 arranged at positions corresponding to the intervals between the light emitting elements 36 in the first column. More specifically, a plurality of light emitting elements 36 is arranged at certain intervals also in the row direction. Referring to FIG. 15C, the light emitting elements 36 can also be said to be arranged, for example, in a lattice pattern, a hatched pattern, or a checkered pattern.

The present disclosure will now be described in detail with reference to an exemplary sample.

A frame member was formed by using UA201 (Ueno Fine Chemicals Industry, Ltd) as a liquid crystal polymer.

A defect occurrence rate indicates a ratio of such projections that degrade display image quality formed on the second end face of the frame member, with respect to a plurality of frame members.

TABLE 1

|  | $\theta 2$ (deg.) | Defect occurrence rate (%) |
| --- | --- | --- |
| Exemplary sample | 5 | 0 |
| Comparative sample | 0 | 100 |

Referring to Table 1, providing a fixed angle $\theta 2$ enables reducing the defect occurrence rate.

With this configuration, the electronic module according to the present disclosure enables preventing the degradation of the display image quality. Further, the present disclosure is not limited to the above-described exemplary embodiments, naturally, and the exemplary embodiments can be suitably changed and combined without departing from the spirit and scope of the present disclosure.

The present disclosure makes it possible to provide an electronic module capable of preventing the degradation of the display image quality.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-061308, filed Apr. 5, 2023, which is hereby incorporated by reference herein in its entirety.

What is claimed is:

1. An electronic module comprising:
   a first substrate; and
   a frame member disposed on the first substrate and including a first surface facing the first substrate, a second surface disposed on a side opposite to the first surface, and an inner wall side surface in contact with the first surface and the second surface,
   wherein the inner wall side surface includes at least a first end face in contact with the first surface, and a second end face in contact with the second surface,
   wherein a normal line to the second surface is a first line, and a line parallel to the second surface, passing through a point where the first end face contacts the second end face, is a second line, wherein an angle formed by the first line and the first end face is different from an angle formed by the first line and the second end face, and the second end face is not parallel to the first line, wherein a distance between the second surface and the second line in a vertical direction with respect to the second surface is larger than or equal to 10% of a distance between the first surface and the second surface, wherein the first substrate includes a display region and a peripheral region including an electrode portion, and the first substrate contacts a third substrate via the electrode portion, and wherein at least a part of the electrode portion overlaps with the frame member.

2. The electronic module according to claim 1, wherein the distance between the second surface and the second line is larger than or equal to 20% and less than or equal to 50% of the distance between the first surface and the second surface.

3. The electronic module according to claim 1, wherein, in a cross-sectional view taken along a line on the first substrate and the frame member, the first end face and the second end face are not curved surfaces.

4. The electronic module according to claim 1, wherein the angle formed by the first line and the first end face is larger than or equal to 20 degrees and less than or equal to 40 degrees, and the angle formed by the first line and the second end face is larger than or equal to 2 degrees and less than or equal to 10 degrees.

5. The electronic module according to claim 1, wherein the frame member includes an overlapping portion overlapping with the first substrate, and the overlapping portion is disposed to surround the display region.

6. The electronic module according to claim 1, wherein the first substrate includes a first main surface facing the first surface, and a bonding member on the first main surface, and wherein the first substrate contacts a second substrate via the bonding member.

7. The electronic module according to claim 1, wherein at least a part of the electrode portion does not overlap with the frame member.

8. The electronic module according to claim 1, further comprising a member, wherein the first substrate includes a first main surface facing the first surface, wherein the member is disposed to cover at least a part of at least the first main surface and an end portion of the third substrate.

9. The electronic module according to claim 1, wherein the frame member is made of a liquid crystal polymer.

10. The electronic module according to claim 1, wherein a light transmitting plate facing the first substrate is provided.

11. The electronic module according to claim 1, wherein an optical member facing the first substrate is provided.

12. An imaging apparatus comprising:
the electronic module according to claim 1;
an image sensor configured to receive light; and
a display unit configured to display an image captured by the image sensor,
wherein the electronic module according to claim 1 is the display unit.

* * * * *